United States Patent [19]

Papenfuhs et al.

[11] 3,939,093
[45] Feb. 17, 1976

[54] DAYLIGHT FLUORESCENT PIGMENTS

[75] Inventors: Theodor Papenfuhs, Frankfurt am Main; Ernst Spietschka, Oberauroff/Taunus; Helmut Troster, Konigstein/Taunus, all of Germany

[73] Assignee: Hoechst Aktiengesellschaft, Frankfurt am Main, Germany

[22] Filed: Dec. 6, 1974

[21] Appl. No.: 530,299

[30] Foreign Application Priority Data
Dec. 6, 1973 Germany............................ 2360787

[52] U.S. Cl.......... 252/301.2 R; 106/23; 106/288 B; 260/281 R
[51] Int. Cl.² .................. C09K 11/06; C09D 11/00
[58] Field of Search ............. 252/301.2 R, 301.2 W

[56] References Cited
UNITED STATES PATENTS

| | | | |
|---|---|---|---|
| 3,455,837 | 7/1969 | Maeder et al.............. | 252/301.2 W |
| 3,741,907 | 6/1973 | Beyerlin...................... | 252/301.2 R |
| 3,753,921 | 8/1973 | Noetzel et al.............. | 252/301.2 R |
| 3,769,229 | 10/1973 | Noetzel....................... | 252/301.2 R |
| 3,785,989 | 1/1974 | Noetzel et al.............. | 252/301.2 R |
| 3,795,628 | 3/1974 | Noetzel....................... | 252/301.2 R |
| 3,812,051 | 5/1974 | Merkle......................... | 252/301.2 R |
| 3,812,053 | 5/1974 | Noetzel....................... | 252/301.2 R |
| 3,812,054 | 5/1974 | Noetzel et al.............. | 252/301.2 R |

FOREIGN PATENTS OR APPLICATIONS
216,155   7/1968   U.S.S.R.

*Primary Examiner*—T. Tung
*Assistant Examiner*—Aaron Weisstuch
*Attorney, Agent, or Firm*—Connolly and Hutz

[57] ABSTRACT

A daylight fluorescent pigment based on condensation resins which contain a compound of the formula

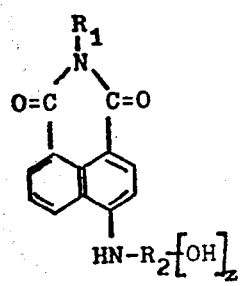

in which $R_1$ is hydroxyalkyl of 1–8 carbon atoms or unsubstituted or substituted phenyl, carboxylic acid amide, cyano, nitro, sulfonic acid amide, alkylsulfone of 1–6 carbon atoms, acetylamino or unsubstituted or substituted benzoylamino or the triazolyl or benzimidazolyl radical, $R_2$ is a straight-drained or branched alkylene radical of 1–8 carbon atoms which may contain as a bridging member between two alkylene moieties the phenylene or cyclohexylene radical or an oxygen or cycloalkylene and zis 1, 2 or 3. Compared with known pigment dyestuffs of the naphthalic acid imide series they have the advantage that they can be prepared with a dyestuff which is technically obtainable in an easy way. The daylight fluorescent pigments of this invention have a very good fastness to bleeding, a very high tinctorial strength, an improved fluorescence intensity and a very good brilliance. They are advantageously suited for the dyeing of lacquers and varnishes, printing pastes, inks, and plastic materials.

12 Claims, No Drawings

DAYLIGHT FLUORESCENT PIGMENTS

The present invention concerns improved daylight fluorescent pigments, a process for their preparation and their utilization.

For the preparation of yellow daylight fluorescent pigments the use of many fluorescent dyestuffs is known. Until now almost exclusively compounds of the 4-amino-1,8-naphthalic acidimide-N-(2′, 4′-dimethyl phenyl)-imide type have been used for the preparation of such pigment series. Especially important is the dyestuff of Colour-Index C.I.No. 56,200, 4-amino-1,8-naphthalic acid (see also U.S. Pat. No. 3,412,035).

Furthermore it is known to use reaction products of epichlorohydrin with 4-amino-1,8-naphthalic acid-N-alkyl- or -N-arylimides (see Russian Patent Specification No. 306,160) as well as the 4-N-butylamino-1,8-naphthalic acid-N-butylimide (see U.S. Pat. Nos. 3,303,168 and 3,412,035) for the preparation of daylight fluorescent pigments.

The dyestuff of Colour Index C.I. No. 56,200 and in particular the reaction products of epichlorohydrins with 4-amino-1,8-naphthalic acid-N-alkyl- and N-arylimides are technically only accessible by an extremely expensive and multi-phased process. For this purpose acenaphthene is nitrated to 5-nitroacenaphthene, oxidized with chromic acid to 4-nitro-1,8-naphthalic acid and reduced to 4-amino-1,8-naphthalic acid, followed by the formation of the imide and eventually by the reaction with epichlorohydrin. This technically very pretentious synthesis, which can only be performed with the aid of different solvents, needs extensive devices, brings up important ecological problems, gives unsatisfactory yields and implies a mandatory purification of the end-products by recrystallization. The foregoing explanations illustrate the uneconomical way of the preparation of these dyestuffs.

As far as the dyestuff 4-butylamino-1,8-naphthalic acid-N-butylimide is concerned, an easily accessible dyestuff with a good yield and purity is obtained by conversion of 4-sulfonaphthalic acid with n-butylamine in excess (see U.S. Pat. No. 2,006,017), but the coloristic properties of the daylight fluorescent pigments prepared therewith are inferior compared with the above mentioned dyestuffs, especially in respect to fastness to light and to solvents as well as to the very important fastness to aromatic solvents.

From the foregoing it becomes evident that further easily accessible and coloristically useful dyestuffs of the 4-amino-1,8-naphthalic acid imide series were sought.

The present invention provides new daylight fluorescent pigments which provide the necessary requirements, and for which the dyestuffs used are easily accessible. These daylight fluorescent pigments based on condensation resins contain dyestuffs of the formula (I)

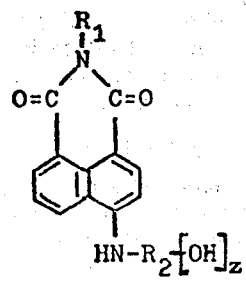

which are incorporated in the condensation resins in a monomolecular form. The formula members of formula I have the following meanings: $R_1$ stands for substituted alkyl, cycloalkyl or aryl radical or a heterocyclic radical; $R_2$ stands for an alkylene radical which may contain between two alkylene moities heteroatoms, isocyclic or heterocyclic radicals, or which stands for a cycloalkylene radical. From these dyestuffs, to be especially mentioned are those in which $R_1$ stands for a straight-chained or branched alkyl radical of 1-8 carbon atoms, preferably of 1-5 carbon atoms which may be substituted by halogen atoms such as chlorine, hydroxy, lower alkoxy, carbalkoxy, carboxy, lower alkylsulfone, carbamyl, sulfamyl, amino, trifluormethyl, acyl or acylamino groups of 2-6 carbon atoms each, for example acetyl amino, benzoylamino, chlorine or methylbenzoylamino or phenylsulfonylamino groups, by aromatic radicals such as phenyl or naphthyl radicals or by heterocyclic radicals, furthermore for a cycloaliphatic radical, for example, a cyclohexyl, alkylcyclohexyl or halogenocyclohexyl radical as well as an aromatic radical, especially of the benzene and naphthalene series, whereby the aromatic nuclei may be substituted; or $R_1$ is a heterocyclic radical such as, for example, a radical of the pyridine, pyrazole, imidazole, triazole, oxazole, thiazole, thiadiazole or pyrimidine series or of their benzo compounds, and wherein $R_2$ stands for a straight-chained or branched alkylene radical of 1-8 carbon atoms, preferably of 2-6 carbon atoms which may be interrupted by hetero atoms such as sulphur or nitrogen atoms, especially by oxygen atoms, or by isocyclic rings such as cycloalkyl or aryl radicals, or by heterocyclic radicals, or $R_2$ stands for a cycloalkylene radical, for example for a cyclopentylene or cyclohexylene radical, and $z$ is the integer 1 or 2, preferably 1. The radicals usable for $R_2$ may also contain further non-ionic substituents such as hydroxy, alkoxy, preferably lower alkoxy, aryloxy, carbalkoxy, preferably lower carbalkoxy, cyano or alkylsulfone groups or aryl radicals.

Best results are obtained from those dyestuffs which correspond to the general formula (II)

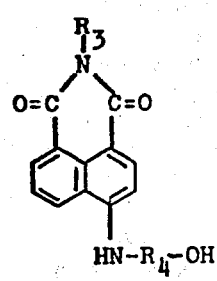

in which $R_3$ stands for a hydroxyalkyl radical of 1-8 carbon atoms, preferably of 1-5 carbon atoms, or for the phenyl radical which may be substituted by chlorine, bromine, alkyl groups of 1-4 carbon atoms, alkoxy groups of 1-4 carbon atoms, carboxylic acid amide, cyano, nitro, sulfonic acid amide, alkylsulfone groups of 1-6 carbon atoms, acetylamino or benzoylamino or benzoylamino substituted by chlorine or methyl groups or methyl and chlorine, or for the triazolyl- or benzimidazolyl radical; $R_4$ stands for a straight-chained or branched alkylene radical of 1-8 carbon atoms, especially of 2-6 carbon atoms, which may contain as intermediate link a phenylene or a cyclohexylene radical or an oxygen atom or a cycloalkylene, especially a cyclohexylene radical, whereby $R_4$ may contain additionally at least one hydroxy group in the aliphatic or cycloaliphatic moiety.

For the preparation of the new advantageous daylight fluorescent pigments, dyestuffs of the formula (III)

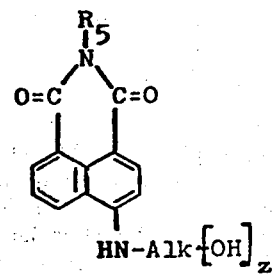

are especially suitable, in which $R_5$ stands for a hydroxyalkyl radical of 1-5 carbon atoms, a cyclohexyl- or the phenyl radical which may be substituted by chlorine, methyl, ethyl, methoxy or ethoxy groups, preferably the phenyl radical which may be substituted by 1-3 methyl groups, Alk stands for a straight-chained or branched alkyl radical of 2-5 carbon atoms, and $z$ is the integer 1 or 2, preferably 1.

Emphasis has to be given to those daylight fluorescent pigments which contain such dyestuffs of the formula (III) in which $R_5$ stands for the β-hydroxy-ethyl, the cyclohexyl or the dimethylphenyl radical, Alk stands for the ethylene or propylene radical, preferably for the ethylene or n-propylene radical, or for the 2-hydroxy-propylene-(1,3)-radical, and $z$ is 1. The bright, greenish-yellow daylight fluorescent pigments of the invention may be prepared in such a way that the dyestuffs of the above mentioned formula (I) are incorporated in the starting components of condensation resins or their preliminary condensates; the resin components are condensed by heating and the so obtained dyed resins are converted following usual methods into the most favorable form for their utilization.

Some of the dyestuffs of the invention are known (see U.S. Pat. Nos. 2,006,017 and 2,415,373). The new dyestuffs can be obtained according to known processes, for example by reacting 1 mol of 4-halogen-1,8-naphthalic acid anhydride with 1 mol of an amine of the formula $H_2N—R_1$ with $R_1$ having the above signification, to yield a compound of the formula (IV)

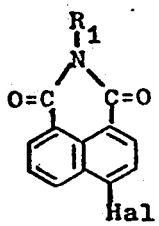

in which Hal stands for a halogen atom and $R_1$ has the signification as indicated above; this compound of the formula (IV) is then reacted with a further mol of an amine of the formula $H_2N—R_2—OH$ with $R_2$ having the above signification to a dyestuff of the formula (I). Compounds of the formula (I) in which $R_1$ has the same signification as $—R_2—OH$ may also be prepared by reacting a 4-halogen-1,8-naphthalic acid anhydride with an amine of the formula $H_2N—R_2—OH$ with $R_2$ of the above mentioned signification. For binding the acid H-Hal which was liberated during the reaction either a monomolar excess of the amine of the formula $H_2N—R_2—OH$ is used or the reaction is carried out in presence of an acid binding agent.

As condensation resins for the daylight fluorescent pigments of the invention, those products of greatest interest are those which are non-elastic, nor fibre-forming and friable and which can easily be converted into a finely dispersed form by crushing. Furthermore, the resins should have a relatively high softening point, preferably above about 100°C, in order to avoid a conglomeration and an agglutination of the resin particles when they are crushed. Furthermore, the resins utilized for the preparation of coating dyestuffs and printing pastes should be insoluble or almost insoluble in varnishing agents as well as in solvents such as benzene, toluene or xylolene and should not swell therein. Furthermore, the resins must possess a good transparency and a sufficient fastness to light. Resins which fulfill these conditions are generally known, and some of them have already been used for the preparation of daylight fluorescent pigments.

Especially suitable are melamine-formaldehyde resins which are obtained by condensation of 1 mol melamine with 1.5-6, preferably with 2.5-3.5 mols of formaldehyde or agents yielding formaldehyde.

These resins may additionally contain aryl- or arylkyl sulfonic acid amide compounds and an additional amount of formaldehyde, advantageously about 0.5-3 mols more than the stoichiometric for their condensation. Calculated on the melamine content the sulfonic acid amides can be present in the resins up to a 20-fold amount by weight. Resins suitable for the preparation of the pigments of the invention are described for example, in the U.S. Pat. Nos. 2,809,954 and 2,851,424.

The new daylight fluorescent pigments excel in their very good fastnessess to bleeding, to solvents and to over-varnishing, especially their outstanding fastness to aromatic solvents, and they are superior to daylight fluorescent pigments which are prepared with already known dyestuffs, for example, with the dyestuff having the C.I. No. 56,200. The daylight fluorescent pigments of the invention possess also a higher tinctorial strength, a higher intensity of fluorescence and a higher brightness.

The resulting high economy achieved with these better properties of the daylight fluorescent pigments of the invention, is additionally considerably increased due to the simpler process of preparation of the dyestuffs used, which in general is a one-step process without solvents and expensive devices, utilizes better ecological conditions, and provides a better yield and purity in comparison with known dyestuffs which are obtainable only under extremely expensive processes. For these reasons the new daylight fluorescent pigments represent considerable technical progress.

The following examples illustrate the invention. The parts indicated therein are parts by weight.

EXAMPLE 1

88.8 parts of toluene sulfonamide and 6.7 parts of paraformaldehyde were mixed with 1.3 parts of the dyestuff corresponding to the formula

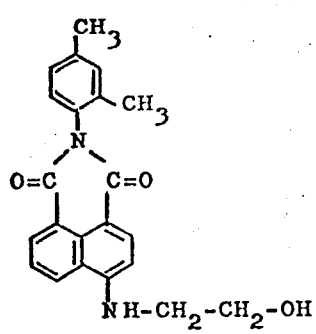

and the mixture melted at 160°C. Into the clear yellow melt 21.8 parts of melamine were added, and stirring was continued for 10–15 minutes at 160°C; then 21.7 parts of paraformaldehyde were added portion-wise at the same temperature. After a further 15 minutes' stirring the viscous melt was cured for 3 hours at 160°C, crushed after cooling, and then moistly pulverized in a ball-mill. After drying, 10.8 parts of the so obtained pigment were triturated as usual with 27 parts of an acrylate resin lacquer in xylene and 8 parts of xylene. The lacquers so obtained are extremely brilliant, greenish-yellow and possess a high tinctorial strength; they also possess a good fastness to solvents.

EXAMPLE 2

A mixture of 102.6 parts of para-toluenesulfonamide, 1.8 parts of the dyestuff of the formula

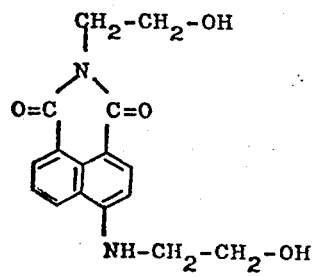

and 25 parts of melamine were heated to 130°C. To the so obtained melt, 30 parts of paraformaldehyde were added portionwise during a 10 minute interval, and the mixture was then heated to 160°C in the course of 10 minutes, while stirring. After further stirring for 20 minutes at this temperature the viscous melt was poured out and crushed after cooling. A yellow-green pigment was obtained which gave brilliant, fast to overvarnishing, yellow green lacquers when triturated in acrylate lacquers.

EXAMPLE 3

A mixture of 51.4 parts of toluenesulfonamide, 12.6 parts of melamine, 24.0 parts of paraformaldehyde and 1.5 parts of the dyestuff of the formula

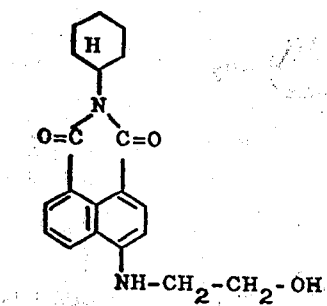

was condensed to a melt at 120°C. The so obtained homogeneous melt was afterwards cured at 160°C during 2 hours. After cooling and crushing a bright green-yellow pigment was obtained. 2 parts of this fluorescing pigment yield, after usual incorporation into a soft-polyvinylchloride, a strong fluorescing yellow-green dye.

Instead of the above mentioned dyestuffs, the dyestuffs mentioned in the following table, corresponding to the formula (I), may also be used with the same result; they present all greenish-yellow to green-yellow, bright daylight fluorescent pigments.

Table

| Ex. | —R₁ | —R₂—OH |
|---|---|---|
| 4. | (2,4-dimethylphenyl) | —CH₂—CH—CH₃<br>      \|<br>     OH |
| 5. | do. | —CH₂—CH₂—O—CH₂—CH₂—OH |
| 6. | do. | —(cyclohexyl)—OH |
| 7. | do. | —CH₂—(phenyl)—CH₂OH |
| 8. | do. | —CH₂—(cyclohexyl)—CH₂OH |

Table -continued
| Ex. | —R₁ | —R₂—OH |
|---|---|---|
| 9. | 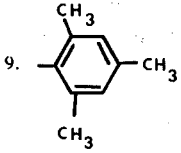 | —CH₂—CH₂—OH |
| 10. | do. | —CH₂—CH₂—CH₂—OH |
| 11. | do. | —CH₂—CH₂—NH—CH₂—CH₂—OH |
| 12. | 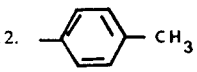 | —CH₂—CH₂—OH |
| 13. | do. | —CH₂—CH—CH₃<br>　　　　OH |
| 14. | 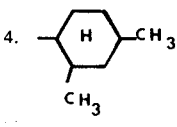 | —CH₂—CH₂—OH |
| 15. | do. | —CH₂—CH—CH₃<br>　　　　OH |
| 16. | 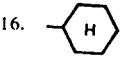 | —CH₂—CH₂—O—CH₂—CH₂—OH |
| 17. | do. | —CH₂—CH—CH₃<br>　　　　OH |
| 18. | do. | —CH₂—CH₂—CH₂—OH |
| 19. | 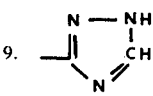 | —CH₂—CH₂—OH |
| 20. | do. | —CH₂—CH₂—O—CH₂—CH₂—OH |
| 21. | 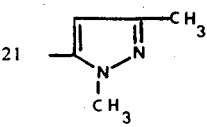 | —CH₂—CH₂—OH |
| 22. | —CH₂—CH₂—OH | —CH₂—CH₂—O—CH₂—CH₂—OH |
| 23. | do. | —CH₂—CH₂—CH₂—OH |
| 24. | do. | —CH₂—CH—CH₃<br>　　　　OH |
| 25. | do. | —CH₂—CH₂—NH—CH₂—CH₂—OH |
| 26. | —CH₂—CH—CH₃<br>　　　　OH | 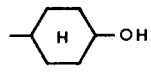 |

Table -continued

| Ex. | —R₁ | —R₂—OH |
|---|---|---|
| 27. | do. | —CH₂—CH₂—OH |
| 28. | do. | —CH₂—CH₂—CH₂—OH |
| 29. | —CH₂—CH₂—OH | —CH₂—CH—CH₂—OH<br>　　　　│<br>　　　　CH₂—CH₃ |
| 30. | 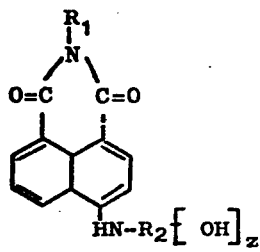 | —CH₂—CH—CH₂—OH<br>　　　　│<br>　　　　OH |
| 31. | do. | —CH₂—CH₂—CH₂—OH |
| 32. | (cyclohexyl) | —CH₂—CH₂—CH₂—OH |
| 33. | do. | —CH₂—CH—CH₂—OH<br>　　　　│<br>　　　　OH |

We claim:

1. Daylight flurorescent pigments consisting essentially of a condensation resin and one or several compounds of the general formula (I)

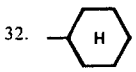

in which $R_1$ stands for a substituted alkyl, cycloalkyl or aryl radical or a heterocyclic radical, $R_2$ stands for an alkylene radical which may be interrupted by heteroatoms, isocyclic or heterocyclic radicals, or which stands for a cycloalkylene radical whereby $R_2$ may be substituted by further non-ionic substituents, and $z$ is 1, 2 or 3, the condensation resin being a melamine-formaldehyde resin which was obtained by condensation of melamine with formaldehyde or with agents yielding formaldehyde and with aryl sulfonic acid amides, aralkyl sulfonic acid amides or with both aryl sulfonic acid amides and aralkyl sulfonic acid amides.

2. A daylight fluorescent pigment as claimed in claim 1 containing a compound corresponding to the general formula of claim 1, wherein $R_1$ is hydroxyalkyl of 2 to 4 carbon atoms, cyclohexyl, lower alkyl cyclohexyl, di-(lower alkyl) cyclohexyl, mono-(lower alkyl)-phenyl, di-(lower alkyl)-phenyl or tri-(lower alkyl)-phenyl and $R_2$ is alkylene of 2 to 4 carbon atoms or hydroxyalkylene of 2 to 4 carbon atoms, and $z$ is 1 or 2.

3. A daylight fluorescent pigment as claimed in claim 1 which contains a compound of the formula as defined in claim 1 in which $R_1$ is β-hydroxy-ethyl, cyclohexyl or dimethylphenyl, $R_2$ is ethylene or propylene or is 2-hydroxy-propylene-(1,3), and $z$ is 1.

4. A daylight fluorescent pigment as claimed in claim 1 which contains a compound of the formula as defined in claim 1 in which $R_1$ is β-hydroxyethyl and $R_2$ is ethylene, and $z$ is 1.

5. A daylight fluorescent pigment as claimed in claim 1 which contains a compound of the formula defined in claim 1 in which $R_1$ is cyclohexyl and $R_2$ is ethylene, and $z$ is 1.

6. A daylight fluorescent pigment as claimed in claim 1 which contains a compound of the formula defined in claim 1 in which $R_1$ is 2,4-dimethylphenyl and $R_2$ is ethylene, and $z$ is 1.

7. A daylight fluorescent pigment as claimed in claim 1 which contains a compound of the formula defined in claim 1 in which $R_1$ is cyclohexyl and $R_2$ is n-propylene, and $z$ is 1.

8. A daylight fluorescent pigment as claimed in claim 1 which contains a compound of the formula defined in claim 1 in which $R_1$ is β-hydroxyethyl and $R_2$ is n-propylene, and $z$ is 1.

9. A daylight fluorescent pigment as claimed in claim 1 which contains a compound of the formula defined in claim 1 in which $R_1$ is 2,4-dimethylphenyl and $R_2$ is n-propylene, and $z$ is 1.

10. A daylight fluorescent pigment as claimed in claim 1 which contains a compound of the formula defined in claim 1 in which $R_1$ is β-hydroxyethyl and $R_2$ is 2-hydroxypropylene-(1,3), and $z$ is 1.

11. A daylight fluorescent pigment as claimed in claim 1 or 2 which contains a compound of the formula defined in claim 1 in which $R_1$ is cyclohexyl and $R_2$ is 2-hydroxypropylene-(1,3), and $z$ is 1.

12. A daylight fluorescent pigment as claimed in claim 1 which contains a compound of the formula defined in claim 1 in which $R_1$ is 2,4-dimethylphenyl and $R_2$ is 2-hydroxypropylene-(1,3), and $z$ is 1.

* * * * *